UNITED STATES PATENT OFFICE.

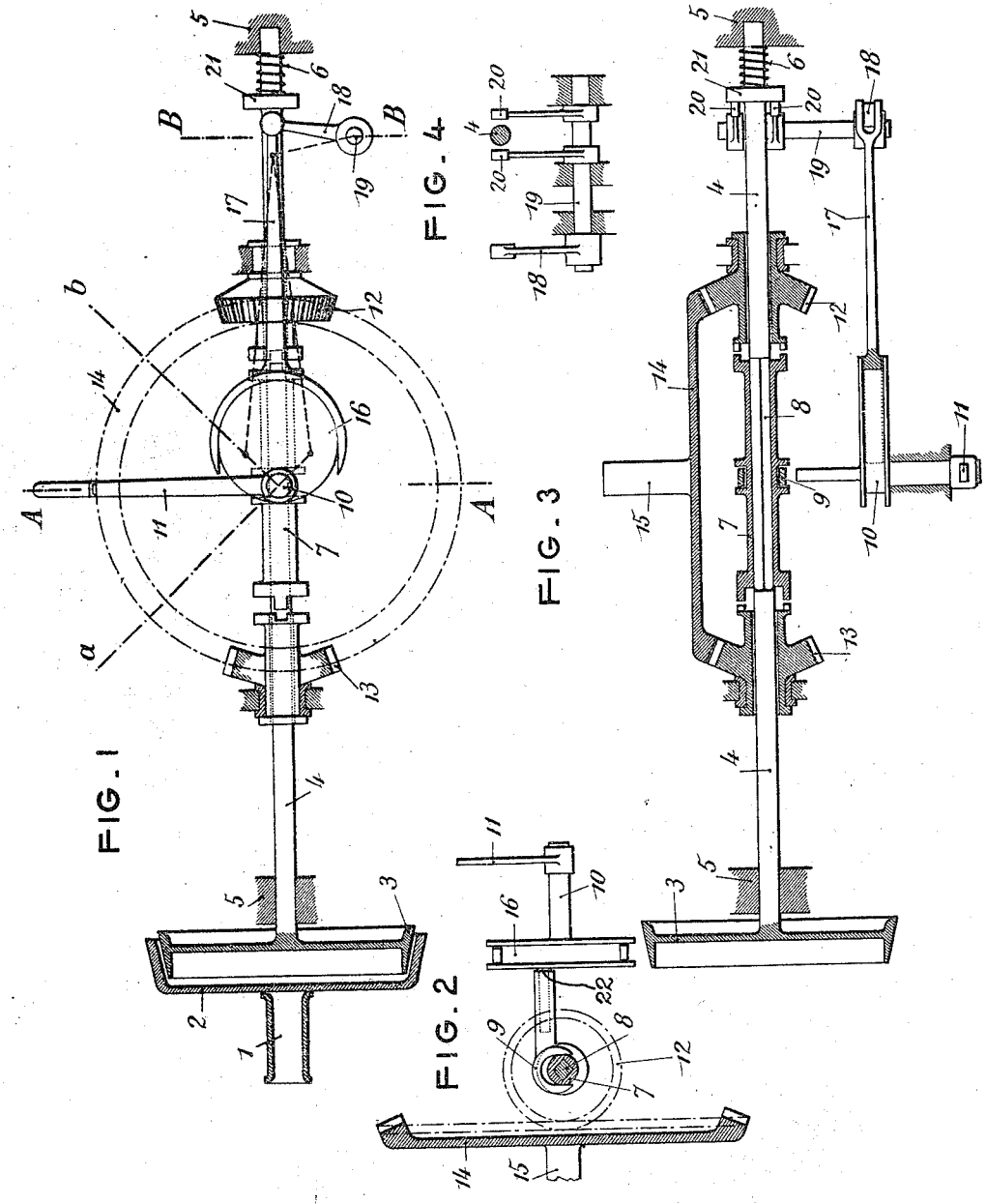

MAURICE LETROTEUR, OF PARIS, FRANCE.

INTERCONNECTED REVERSING MECHANISM AND CLUTCH.

1,268,735. Specification of Letters Patent. Patented June 4, 1918.

Application filed February 28, 1918. Serial No. 219,723.

*To all whom it may concern:*

Be it known that I, MAURICE LETROTEUR, a citizen of the Republic of France, residing at Paris, 63 Rue Blanche, Seine Department, in the Republic of France, have invented certain new and useful Improvements in Interconnected Reversing Mechanism and Clutches, of which the following is a specification.

This invention has for its object to provide an improved apparatus for throwing into and out of gear and reversing the direction of motion of machinery, which is adapted to be operated by means of a single lever and is applicable with advantage to various machines and devices, for instance to tractors, pressing roller, etc.

An embodiment of this improved apparatus is illustrated by way of example in the accompanying drawings in which:

Figure 1 is a longitudinal section of the said embodiment.

Fig. 2 is a cross section on the line A—A of Fig. 1.

Fig. 3 is a horizontal section taken along the axis of the main shaft.

Fig. 4 is a vertical section on the line B—B of Fig. 1.

1 is the engine shaft on which there is fixed a friction clutch cone 2.

A corresponding cone 3 is fixed on a shaft 4 which is arranged as an axial extension of the shaft 1 and is independent of the latter. The shaft 4 is slidable in its bearings 5, and is pressed toward the shaft 1 by a spring 6 which thus has a constant tendency to engage the cones 2 and 3 with each other. 7 is a sleeve slidable on a square portion 8 of the shaft 4 in such a manner as to be compelled to rotate therewith. This positive driving of the sleeve 7 may however be produced by means of a key or in any other manner.

This sleeve which is formed with claws at its ends is adapted to be slid along by means of a fork 9 which is pivoted on a pin 22 fixed on a disk 16. This disk is fixed eccentrically on a shaft 10 provided with an operating lever 11.

The claws of the sleeve 7 are adapted to engage alternately with the corresponding claws of two bevel pinions 12 and 13 which are loose and rotatable on the shaft 4 and are engaged with a large bevel wheel 14 fixed on a driven shaft 15 located at right angles to the shaft 4. According to the direction of movement of the sleeve 7, the wheel 14 will be driven by one or the other of the pinions 12 and 13 and will therefore rotate in one or the other direction.

The eccentric 16 fixed on the shaft 10, drives through the medium of an eccentric rod 17 and a crank 18, a shaft 19 provided with a fork 20. This fork bears against an annular member 21 fixed on the shaft 4 whereby the latter can be pushed in opposition to the spring 6 for the purpose of disengaging the clutch cones.

The operation of the improved apparatus is as follows: In the position shown in full lines in Fig. 1, the sleeve 7 does not drive either of the pinions 12 and 13, and the cone 3 is kept away from the cone 2 by the action of the eccentric 16; the machinery is therefore out of gear.

For the purpose of throwing the machinery into gear for forward travel, the lever 11 is moved into the position *a*. The sleeve 7 will then be in engagement with the pinion 12, and at the same time the eccentric 16 will move the fork 20 in such a manner as to allow the cones to be engaged with each other by the action of the spring 6. The dimensions and positions of the parts are such that the machinery will not be thrown into gear except when the claws are in complete engagement.

By returning the lever 11 into its midposition the machinery is thrown out of gear.

On moving the lever into the position *b*, the sleeve 7 will engage the pinion 13, and the eccentric 16 will again operate the parts for throwing the machinery into gear as in the preceding case, in such a manner that the cones 2 and 3 will be engaged with each other when the claws are fully engaged.

The improved apparatus thus allows of producing by means of one single lever, forward travel, rearward travel and disconnection of the drive, while assuring automatically in both directions of motion a complete engagement of the claws before the friction cones are coupled together, thereby avoiding all risk of damaging and breaking the claws during the throwing into and out of gear.

The toothed wheels are always in engagement.

The driven shaft 15 may carry directly the parts which are to be rotated or which are to serve for transmitting motion to any desired mechanism.

Having now particularly described and ascertained the nature of my said invention, and in what manner the same is to be performed, I declare that what I claim is:

An apparatus for throwing into and out of gear and reversing the direction of motion of machinery, comprising a friction driving cone, a sliding shaft located in axial prolongation of the said cone, a friction cone on said shaft, an engaging spring acting upon said shaft, a driven shaft located at right angles to the said sliding shaft, a bevel wheel on said driven shaft, pinions freely rotatable on the said sliding shaft, adapted to gear with the said bevel wheel, said pinions having clutch claws, a sleeve slidable on said slidable shaft, adapted to be rotated by the latter, said sleeve having claws adapted to engage the claws on the said pinions, an operating shaft parallel to said driven shaft, an eccentric disk and a pin on said operating shaft, means operable by said eccentric for pushing said sliding shaft in opposition to its engaging spring, and means actuated by said sleeve for shifting said claw sleeve along said sliding shaft, substantially as set forth.

In testimony, that I claim the foregoing as my invention I have signed my name in presence of two subscribing witnesses.

MAURICE LETROTEUR.

Witnesses:
CHARLES BAUDRY,
CHAS. P. PRESSLY.

Copies of this patent may be obtained for five cents each, by addressing the "Commissioner of Patents, Washington, D. C."